June 1, 1937.　　　A. H. BRUNDAGE　　　2,082,322

WATER PURIFIER AND FILTER

Filed Jan. 29, 1935

INVENTOR
ALFRED H. BRUNDAGE
BY
　austin & Dix
ATTORNEY

Patented June 1, 1937

2,082,322

UNITED STATES PATENT OFFICE 2,082,322

WATER PURIFIER AND FILTER

Alfred H. Brundage, Maplewood, N. J.

Application January 29, 1935, Serial No. 3,929

2 Claims. (Cl. 210—134)

This invention relates to a novel filter for liquids, and, more particularly, to an improved filter which is adapted to purify drinking water.

A feature of the invention resides in the provision of such a filter which is capable of treating a liquid to remove impurities therefrom, which filter is simple and relatively inexpensive to construct, and efficient in operation.

A more specific feature resides in the provision of a filter of this character which is adapted to soften, decolorize and/or remove objectionable odors and tastes from water.

A further feature of the invention resides in the construction of a filter which is adapted to employ extremely finely divided material, such as activated carbon, and which is capable of enabling the liquid to be treated to filter through the carbon without carrying the same out of the filter.

Still another feature of the invention resides in providing a filter which contains finely divided filtering material and which is provided with means including fibrous material for arresting or entrapping fine particles without becoming clogged by them during normal periods of operation, and without becoming so matted that free flow of liquid is prevented.

An additional feature of the invention lies in a construction of the character mentioned which can be readily assembled and disassembled, and which permits salvaging of the finely divided material for regeneration and reuse.

A further feature of the present invention lies in the provision of a filter which enables a rapid and ready passage of the liquid to be treated, so that the filter is capable of treating a large volume of liquid in a short time.

A further object of the invention lies in the provision of a filter construction which includes a combination of several or all of these features in a unitary, compact and inexpensive casing which is adapted to be readily connected to a source of supply and to a bottle or other container for receiving the purified liquid.

A particular use of the present construction is in the purification of drinking water from a city water supply or other source, although it will be understood that the construction is useful for purifying other liquids, such as naphtha, alcohol, gin, perfumes and the like, where it is desired to employ extremely finely divided material as a filtering medium.

Other objects and advantages will in part become apparent or in part be pointed out in connection with the following detailed description of one form of construction illustrating the invention, reference being had to the accompanying drawing wherein.

Figure 1:
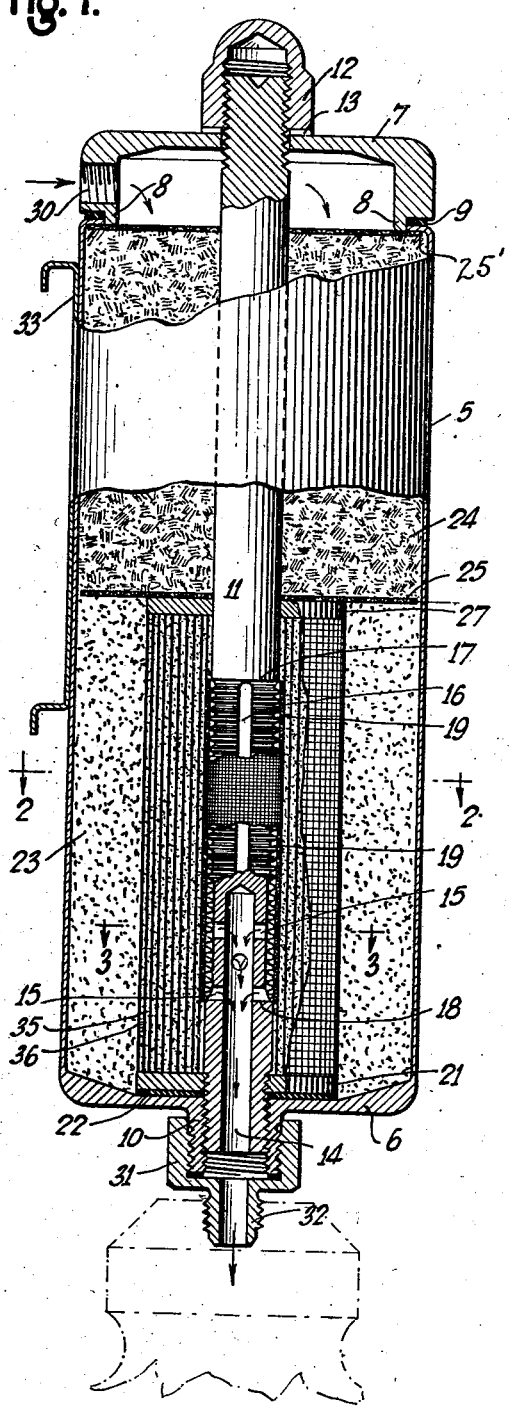
Fig. 1 is a front elevation, partly in section, showing one form of construction in accordance with the invention.
Figure 2:
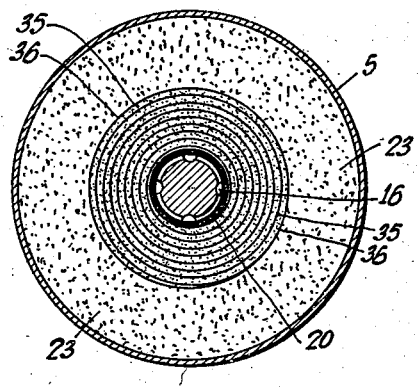
Fig. 2 is a horizontal section taken on the line 2—2 of Fig. 1.

With reference to the drawing, the construction may comprise a casing 5 of generally cylindrical or other convenient shape. This casing may be formed of aluminum or any other satisfactory material which is inert to the filtering media, and liquid to be treated. It may be provided with an integral or other type of bottom 6, and may be open at the top and adapted to cooperate with a cover 7 having a flange 8 adapted to seat snugly within the rim of the casing 5. There may be interposed between the cover and casing a suitable washer 9, formed of rubber or other similar yielding material, in order to make the joint watertight.

The casing 5 may be provided with an annular portion or sleeve 10 formed so as to extend beyond the bottom thereof, this portion being internally threaded for threadedly engaging the lower end of a central member 11, which member may extend through the cap 7 and be held in engagement therewith by means of a nut 12, threaded onto the upper end of the member 11 and adapted to bear against the cap 7 through a resilient washer 13.

Figure 3:
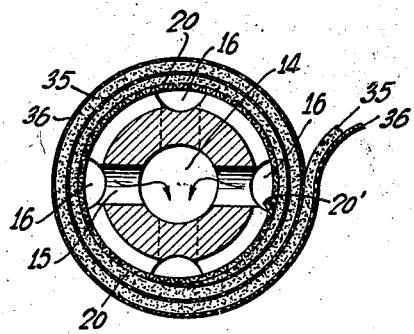
Fig. 3 is a horizontal section, taken on enlarged scale, taken on the line 3—3 of Fig. 1 looking in the direction of the arrows.

The lower end of the member 11 is preferably provided with a central passage 14, which may extend from a suitable point above the bottom of the casing to a point below the same. Any convenient number of generally horizontal passages 15 may be formed in member 11 so as to extend from certain grooves 16 into the passage 14. These grooves 16 lie on the outside of member 11 and may advantageously extend lengthwise thereof for a convenient distance, for instance to levels above and below the passages 15 so that liquid may flow from the grooves into these passages. With reference to Fig. 3, it will be noted that four such longitudinal grooves 16 are shown, although any other convenient number may be employed. These parts may be of any suitable size and shape, but it has been found that satisfactory results are achieved where the grooves 16, passages 15 and passage 14 are correlated in the manner illustrated.

The member 11, between the sections indicated at 17 and 18, may advantageously have formed on its outer side a series of circular or spiral grooves 19 for purposes hereinafter mentioned, and around this section there is preferably wrapped a wire screen 20 of suitable mesh to permit water to readily pass through it, into the grooves 19 and thence into the passages 16, whence the liquid flows through passages 15 into the passage 14, as indicated by the arrows in Figs. 1 and 3. This screen serves to prevent the fibrous material from becoming packed into the grooves 16, 19, thus keeping these open to the flow of water. Surrounding the member 11 from a point below the section 18 to a point substantially above the section 17, where the passages 16 terminate, there is provided means for preventing finely divided material within the casing from being washed or carried out of the filter by the liquid. This means preferably comprises a roll of material, preferably fibrous, which is adapted to be compactly positioned, while being of such character that the liquid does not wad or mat it enough to prevent or hinder the flow of liquid through this means. At the same time, this means must be capable of arresting or entrapping of the fine particles of activated carbon or the like so as to prevent them from being carried out of the filter, with the resulting loss of carbon and the production of a sediment in the filtrate liquid. Particularly satisfactory results are secured when this means comprises a compressed roll of normally loose or fluffy fibrous material 35, such as cotton, preferably not absorbent, in combination with a layer of mesh, such as gauze or cheese-cloth 36, preferably interposed between successive layers of the cotton or the like. It has been found that where such material is thus formed into a series of packed layers between each pair of which there is a fabric or textile material, the above results may be secured to good advantage.

By way of example of one excellent type of construction, there may be employed cotton wadding which is preferably white and sterile. The type of cotton wadding which is often used for filtering milk is good, but other grades such as some of those used by tailors for padding shoulders of coats may serve. For instance, such wadding in its fluffed or uncompressed condition may be in the order of ¼ inch, more or less, in thickness, and may be overlaid on one side with a layer of porous, loosely woven gauze or cheesecloth. Cheese-cloth having 20 x 20 threads per square inch is satisfactory, though other materials may be substituted. The cotton wadding may have a glazed facing on the other side thereof which is relatively dense or closely compacted. Such a facing is ordinarily formed on one side of such cotton wadding, as marketed by textile companies or manufacturers of hospital supplies. When about four yards of such material are tightly wound upon a central member 11 having a diameter of ¾ inch, so that the total diameter of the wadding is by comparison about 2¼ inches, good results are produced. This winding of the material results in a compression of the wadding to such extent that even very fine activated carbon of such dimensions that it passes a 200 mesh screen may be prevented from passing through this means. However, these details are not deemed to be essential, for various changes may be made in the proportions and other details without sacrificing the advantages pointed out.

If desired, a suitable collar 21 may be threaded on to the bottom of the central member 11 and may have between it and the bottom of the casing a washer 22. Collar 21 serves as a bearing for one end of the rolled cotton or like material. For bearing against the other end of the cotton a washer 27, formed of metal or the like may be slid onto the central member 11.

While the cotton or the like employed for entrapping the finely divided material may advantageously be wrapped around a central upright member, with the finely divided material surrounding it, so that a generally horizontal flow through the cotton is produced, which aids in preventing minute particles of carbon or the like from being washed through the filter, it will be appreciated that a vertical flow may be feasible. For instance, several flat layers of fibrous material separated by gauze or the like might be placed one above the other and be compressed to the proper extent to catch or arrest tiny particles without clogging the pores of the material.

Where the filter is to be employed in connection with a plurality of different types of finely divided material, I prefer to place the more finely divided material, 23 in position surrounding or adjacent the fibrous material, and to provide suitable means for maintaining this material separate from other filtering material 24 which, when used, may be placed in the upper part of the casing 5. For instance, between the material 23 and the material 24 there may be interposed a wire screen 25 which surrounds the member 11 and extends close to the wall of the casing.

In the example illustrated, the material 23 may advantageously be any high grade activated carbon. It is preferably very finely divided and those skilled in the art will appreciate the advantages of employing superior grades of very fine material. However, the invention in its broader aspects is not limited to any particular type of activated carbon, or even to the use of carbon. The material 24, may advantageously comprise any suitable powdered or granulated zeolite. Preparations of this type are found on the market and serve as water softeners.

In assembling the construction thus far described, the central member 11 (which may be formed as an integral casting or be machined according to any convenient practice) is first overlaid with screen 20, one end 20' of which may be hooked into one of the grooves 16, while the balance of the screen may be wrapped tightly around the member 11. The fibrous material, preferably though not necessarily with its gauze face to the outside, may then be wrapped tightly around the post 11, by hand or by means of any satisfactory known type of machine, so that the screen 20 is held in place and at the same time the cotton or fibrous material is compressed. The free end of the fibrous material may be held fast in any convenient way. Collar 21 may serve as an abutment for one end of the cotton during the wrapping, if this element has been previously applied to the member 11. Washer 22 may next be placed upon the lower end of the member 11, and this member may then be threaded firmly into the sleeve 10 formed on the bottom of the casing. Washer 27 is then placed in position.

Following this operation, the activated carbon or the like may be poured into the container 5 so as to fill the space between the cotton and the walls of the casing. It may be left in loose condition or, if desired, it may be tamped down slightly. Screen 25 may be next placed in position and the zeolite or other treating material may be poured into the top of the casing. A screen 25' may be applied on top of the material 24 and serves to spread or diffuse the water and prevent it from washing deep holes in the material. Thereafter the cover is assembled with the casing proper and with washer 9, and the washer 13 and nut 12 are then assembled, the nut being screwed down tight.

In order to provide for the inflow of liquid to the filter any suitable opening 30 may be provided in the cover and threaded for receiving one end of flexible tubing or the like, the other end being attached to a water faucet or pipe. A suitable bushing 31 having a threaded end 32, for engaging similar tubing, may be threaded on to the sleeve 10. A bracket 33 of any convenient design may be secured to the casing 5 for enabling the same to be hung on a cooperating socket or fixture attached to a wall.

When it is desired to filter water or the like, it is then simply necessary to attach tubing to the opening 30 and to place a bottle beneath the outlet 32, or to connect tubing to this outlet and fill the bottle through the tube.

As intimated above, the present construction has been particularly developed in connection with the furnishing of purified water for 5 gallon bottles or other containers commonly used with coolers for drinking water for office or home purposes. When a construction in accordance with the present invention is employed, it is possible to filter about 800 gallons of water without any carbon getting into the filtrate. Also, very little carbon gets into the cotton, although some slight amount may penetrate into the successive layers of the fibrous material. However, none passes the final layer, each layer entrapping all or most of what passes a preceding layer. On the other hand, the filtration rates are not excessively reduced even toward the end of such a run, so that the device lasts for a satisfactory commercial period. Moreover, when the filter medium has outlived its usefulness, the filter in service may simply be replaced by another unit, while the casing of the exhausted unit may be readily emptied by first removing the cover 7, then shaking out the zeolite 24, removing the screen 25, shaking out the carbon, and finally removing the member 11 and the fibrous material wound upon it. This material may be discarded while the zeolites and activated carbon may be readily regenerated or replaced by new material when the filter is reassembled.

It will be found that even after extended use, the activated carbon has not entirely penetrated to the center layer of the cotton or other material which is wrapped around the member 11. In other words, while the water has readily penetrated through the carbon and through the fibrous material, so that a 5 gallon bottle may be filled in a little over a minute, the condition of the cotton has remained such that the carbon is entrapped by what may be termed, though perhaps not accurately, a capillary attraction.

Without intending to limit the possible modifications of the present construction, a few possible variations may be mentioned. For instance, instead of the gauze or cheese-cloth interposed between the layers of fibrous material, there may be employed a copper screen, of say 40 mesh, or other suitable mesh material, although such material may be somewhat more expensive than textile mesh, and may tend to increase somewhat the size of the filter for a given capacity. Then too, for example, instead of the central metal member 11 it may be possible to employ a filter stone of any convenient usual type, so that the liquid after passing through the fibrous material may flow out through the filter stone. Moreover, if desired, the fibrous material and intermediate layers of mesh may be preliminarily formed as a cartridge adapted to be slipped on to the central member when the filter is assembled.

Through the present construction, there is thus provided a device in which an extremely finely divided material may be employed without this material being washed through into the filtrate. It is believed that part of this effect is due to the compact and yet not too compact arrangement of the several portions or layers of the fibrous material, which are kept apart sufficiently by the fabric or mesh to avoid such compacting as would prevent the penetration of the water, while at the same time the fibrous material entraps the very fine particles of 200 mesh size or even less.

Another advantage of the invention is particularly notable in connection with purification of drinking water, where it is highly desirable to have a rapid flow of water through the filter, under the normal pressure or head of the supply, so that people will not have to wait a long time for a 5 gallon bottle or other container to be filled.

Furthermore, the construction is extremely simple to manufacture and assemble and may be used over and over again by replacement only of the least expensive parts of the filter. In addition, provision is made for the use of a plurality of different types of finely divided filtering material which can each be recovered separately so that either or both may be discarded or regenerated independently of the other. The combination enables the filter to remove all the more common and objectionable impurities in ordinary drinking water, such as chlorine odor and taste, fine particles and even possibly certain bacterial impurities. Certain substances in solution are also removed. Another more detailed advantage resides in preventing the wrapping material from becoming packed into the grooves through which the liquid runs into the discharge or outlet pipe, while at the same time the wrapping presents a maximum area for adsorbing the tiny particles of the finely divided filtering material.

While I do not set down here all the detailed advantages of the various combinations of features of the present construction, it will be appreciated that there are numerous structural advantages which fall within the scope of the invention.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

I claim:

1. As an article of manufacture, for use in filters, a central core, and means wound tightly on said core in spiral fashion comprising fibrous material of the character of cotton wadding, said wadding being overlaid with a continuous strip of textile mesh material lying between successive layers of the wadding, and said wadding being compressed adjacent said core from a normal thickness in the order of one-quarter of an inch to a thickness which said wadding has when about four yards of it are wound upon a core of three-quarter inch diameter with the outside diameter of the wadding in the order of two and one-quarter inches.

2. In a filter for purifying water for drinking purposes, a casing, a central post carried within the casing, a central outlet passage formed in the post, means whereby said passage is connected to the outside of the post, a plurality of alternate layers of cotton and cheese-cloth wrapped tightly round said post, whereby said cotton is maintained in compressed relation, finely divided activated carbon carried within said casing and surrounding said fibrous material, zeolites carried in the upper part of said casing, and means to maintain said carbon and zeolites effectively separate.

ALFRED H. BRUNDAGE.